HOUSING AND LEAD ASSEMBLY FOR HIGH-FREQUENCY SEMICONDUCTOR DEVICES
Filed May 23, 1967

INVENTORS
HOWARD W. BERTRAM
OLIVER P. HART AND
ROBERT E. KLEPPINGER
BY M. Y. Epstein
ATTORNEY United States Patent Office 3,465,210
Patented Sept. 2, 1969

3,465,210

HOUSING AND LEAD ASSEMBLY FOR HIGH-FREQUENCY SEMICONDUCTOR DEVICES

Howard W. Bertram, Somerville, Oliver P. Hart, Berkeley Heights, and Robert E. Kleppinger, Raritan, N.J., assignors to RCA Corporation, a corporation of Delaware Filed May 23, 1967, Ser. No. 640,563
Int. Cl. H01l 5/00, 13/00
U.S. Cl. 317—234 4 Claims

ABSTRACT OF THE DISCLOSURE

A high-frequency semiconductor device comprises an elongated, plastic-molded envelope having input and output leads extending outwardly from opposite ends of the envelope. The envelope comprises two end-to-end joined cylindrical members, each member having, in cross section, the shape of a segment of a circle, and each member having a flat side surface, the two surfaces lying in a common plane. The transverse extent of the two cylindrical members are unequal, whereby an arcuate ledge is provided where the two members join. The envelope configuration provides indicia means by means of which the endwise and angular orientation of the device can be readily determined for the purpose of mounting the device on a chassis.

A metallic shield is mounted on the device transversely thereof, the shield fitting snugly around a side portion of the device and being abutted against the device envelope ledge.

BACKGROUND OF THE INVENTION

This invention relates to semiconductor devices, and particularly to semiconductor devices having utility in high frequency applications.

In the use of semiconductor devices at high frequencies, it is recognized that higher efficiency operation is obtained if the leads and external circuit elements connected to the "input" electrodes of the devices are shielded from the leads and external circuit elements connected to the "output" electrodes of the devices. Present arrangements for mounting such semiconductor devices on a chassis and providing suitable shielding are somewhat complex and expensive.

In the assembling of such devices on a chassis, the leads are bonded to various terminals. For the purpose of increasing the rate at which such assembling is performed, it is desirable that the devices contain indicia means by means of which the orientation of the devices can be readily determined.

SUMMARY OF THE INVENTION

A semiconductor device comprising an envelope having leads extending outwardly from opposite ends of the device is provided. The envelope comprises a unitary body including two cylindrical portions disposed in tandem. The portions are of different diameter to provide a stepped surface transverse to the longitudinal axis of the envelope. The unitary body has at least one flat side surface extending from one end thereof to the other.

For shielding the leads at one end of the envelope from the leads at the other end of the envelope, a metallic shield is provided having an opening therethrough corresponding in size and shape to the smaller of the two envelope cylindrical portions. The shield is mounted on the device envelope transversely thereof, preferably in snug fit with the smaller cylindrical portion, and in abutting relation with the envelope transverse surface.

DESCRIPTION OF THE PREFERRED EMBODIMENTS

Figures 1, 2, 3, 4:
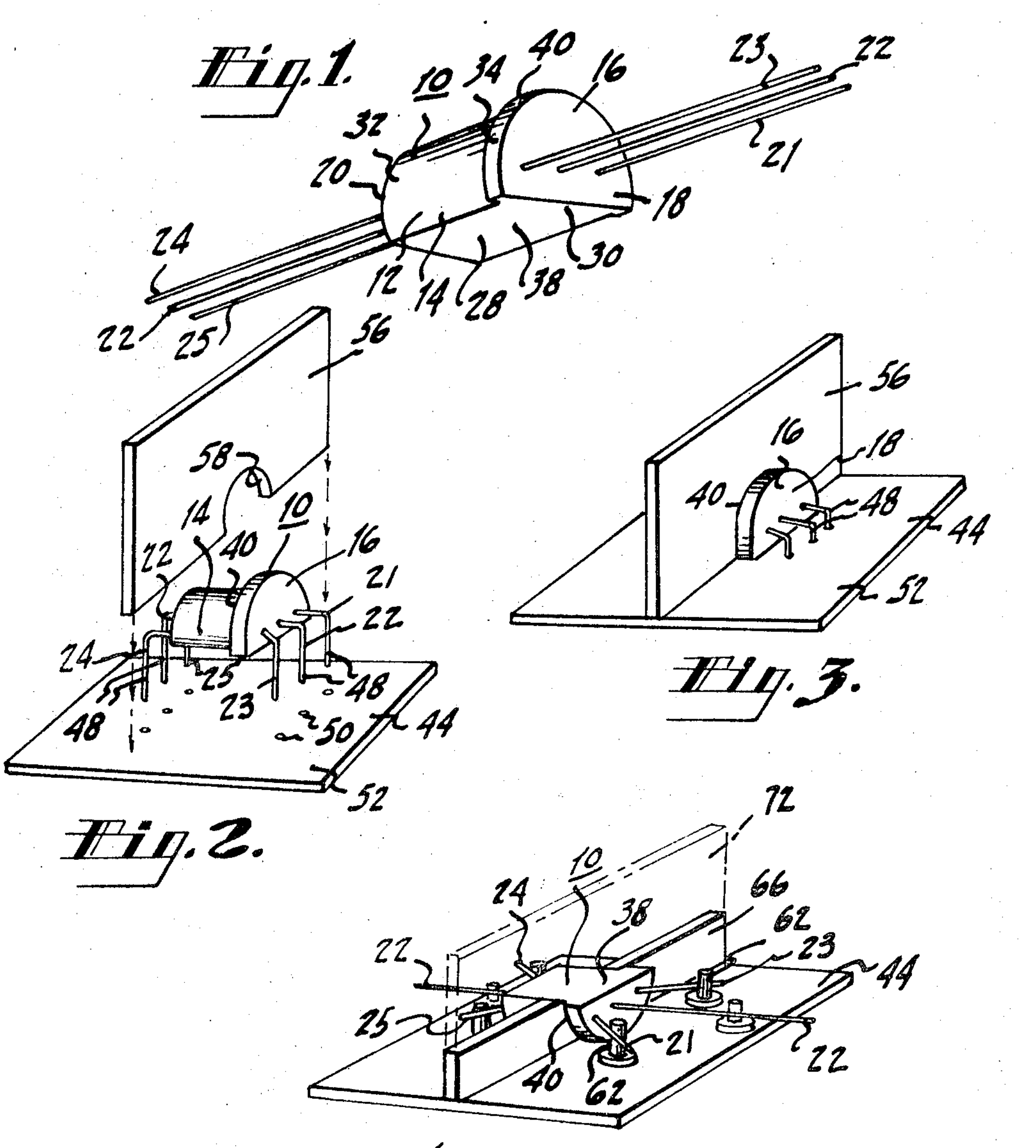
FIG. 1 is a view in perspective of one embodiment of a semiconductor device according to the present invention.
FIG. 2 is an exploded view, in perspective, of an arrangement for mounting the device shown in FIG. 1.
FIG. 3 is a view in perspective showing the parts shown in FIG. 2 in assembled relation.
FIG. 4 is a view in perspective of another arrangement for mounting the device shown in FIG. 1.

With reference to FIG. 1, a semiconductor device 10 is shown comprising an elongated envelope 12 including two end-to-end connected cylindrical end portions or members 14 and 16. In the present embodiment, the envelope 12 is a solid member of a plastic-like material molded to the shape shown. The materials of the envelope can comprise any of several known materials used for encapsulating purposes, such as transfer molding silicones or epoxyes.

Embedded within the envelope 12 is a semiconductor pellet, not shown, including a source, a drain, and two gate electrodes. The device 10 is of the type known as an MOS device. Extending outwardly from opposite ends 18 and 20 of the elongated envelope 12 are a plurality of leads 21, 22, 23, 24, and 25. In this embodiment, the lead 22 extends completely through the envelope 12, and the pellet is mounted on a portion of the lead 22 embedded within the envelope. Within the envelope 12, each of the leads 21 and 23 is electrically connected to a respective one of the gate ("input") electrodes of the pellet, and the two leads 24 and 25 are electrically connected to the source and drain ("output") electrodes, respectively.

Means for electrically connecting the leads 21, 23, 24, and 25 to their respective pellet electrodes, for mounting the pellet on the lead 22, and for molding the envelope 12 around the pellet and portions of the leads 21–25 are known.

In the illustrative embodiment, each of the envelope cylindrical members 14 and 16 has, in cross section, the shape of a segment of a circle, and each cylindrical member 14 and 16 comprises a flat side surface 28 and 30, respectively, and a curved side surface 32 and 34, respectively. The flat side surfaces 28 and 30 of the two members 14 and 16 lie in a common plane, thereby providing the envelope with a continuous flat surface 38.

The envelope cylindrical members 14 and 16 can have shapes other than the segmental shape illustrated. For example, the members can have a trapezoidal cross section, or the like. Also, the sides of the members need not be parallel to the longitudinal axis of the envelope.

The cylindrical members 14 and 16 are of unequal transverse extent, and an arcuate ledge 40 is thus provided intermediate the ends 18 and 20 of the envelope 12 where the members 14 and 16 join.

An advantage of the envelope configuration illustrated is that it provides easily recognizable indicia means for orienting the device in a desired angular and endwise orientation. This greatly reduces the possibility of incorrect mounting of the device on a chassis. Also, the various envelope surface discontinuities provide means for positive grasping of the device for automatic handling thereof.

One means for mounting the device on a chassis, such as a printed circuit board 44, is shown in FIGS. 2 and 3. As shown, the leads 21–25 are provided with a right angle bend, and the downwardly extending lead portions 48 are inserted through openings 50 in the circuit board 44. Electrical connections to the lead portions 48 are made by known means, not shown. The flat surface 38 of the envelope 12 rests on the top surface 52 of the circuit board 44. The close fit of the device 10 on the chassis is especially desirable where high packing density of electrical components is required, as in certain military applications.

For shielding the oppositely extending groups of leads 21 and 23, and 24 and 25 from one another and from various other electrical components (not shown) mounted on the chassis and connected to the leads, a flat metal shield 56 is mounted on the device 10 intermediate the ends thereof. The shield 56 has a segmentally-shaped opening 58 therethrough corresponding in size and shape to the transverse dimension of the smaller envelope member 14. The shield 56 fits snugly around the device 10, and is abutted against the envelope ledge 40. Preferably, the shield 56 is also secured to the circuit board 44, as by means of soldering. The snug fit of the shield 56 on the device 10 serves to hold the device firmly in place on the circuit board.

FIG. 4 shows another arrangement for mounting the device 10 on a chassis such as a printed circuit board. In this arrangement, the leads 21–25 are not bent, and upright terminal posts 62 are provided on the circuit board 44 to which the various leads are connected, as by soldering. A shield member 66 is mounted on the circuit board 44, as by means of pins (not shown) extending through and soldered to holes in the board 44. The shield member 66 has a segmentally-shaped opening therethrough corresponding in size to the transverse dimension of the device envelope member 14. As shown, the device 10 is mounted flat side 38 up on the shield member 66, the member 66 serving as a cradle for the device. The device 10 fits snugly within the shield opening, and the device envelope ledge 40 abuts against the shield 66.

To provide further shielding between the device lead groups and the circuit elements connected thereto, and to provide more secure mounting of the device 10, if desired, a second shield member 72, shown in phantom in FIG. 4, is mounted on the device flat surface 38 and on the shield member 66. Preferably, the two shield members 66 and 72 are secured together, as by means of soldering.

Alternatively, the two shield members 66 and 72 can be replaced by a single shield having a segmentally-shaped opening therethrough through which the smaller end of the device is inserted during the mounting of the device. Preferably, the cylindrical member 16 of the envelope is larger than the opening through the shield, whereby incorrect endwise mounting of the device is rendered impossible.

In the embodiment described, the semiconductor pellet is mounted on the through lead 22. In another embodiment, not shown, the pellet is either mounted on one of the leads 21, 23, 24, or 25, or on another lead provided for this purpose. In either case, the through lead 22 can be used to provide additional shielding between different ones of the leads within the device envelope.

What is claimed is:

1. In combination:

(a) a semiconductor device including a solid molded envelope comprising two cylindrical portions disposed in end-to-end contiguous relation, said portions being of similar shape, and each portion having a flat side surface lying in a common plane, one of said portions being of greater lateral dimension thereby providing a stepped surface transverse to the longitudinal axis of said envelope, a plurality of leads extending from the opposite ends of said cylindrical portions; and (b) a sheet metal shield member disposed transversely of the longitudinal axis of said envelope, said shield having a cut-out at one edge thereof shaped to receive the smaller one of said cylindrical portions with the flat side thereof coplanar with said one edge, said shield being disposed against said stepped surface.

2. The combination as in claim 1 wherein:

each of said cylindrical portions has, in cross section, the shape of a segment of a circle, said stepped surface being arcuate; and said shield cut-out having a segmental shape and being of a size providing a snug mounting of said shield on the smaller of said cylindrical portions.

3. The combination as in claim 1 wherein one of said leads extends through said envelope and outwardly of both ends thereof, said through lead being disposed between others of said leads; and a semiconductor pellet mounted on one of said other leads within said envelope.

4. In combination:

(a) a semiconductor device comprising an envelope, and a plurality of leads extending outwardly from opposite ends of said envelope;

said envelope having a curved side surface and a flat side surface providing angular orientation indicia means for said device, one end portion of said envelope having a larger transverse dimension than the other end portion of said device, said end portions being joined and providing a ledge having a surface transverse to an axis through said opposite ends of said device; and (b) a shield having an opening therethrough mounted transversely on said envelope, said opening being shaped and dimensioned to receive the smaller one of said end portions in snug fit therewith, and said shield being disposed against said ledge.

References Cited

UNITED STATES PATENTS

| | | | |
|---|---|---|---|
| 3,235,937 | 2/1966 | Lanzl et al. | 29—25.3 |
| 3,264,712 | 8/1966 | Hayashi et al. | 29—155.5 |
| 3,265,806 | 8/1966 | Burks et al. | 174—52 |
| 3,281,628 | 10/1966 | Bauer et al. | 317—234 |

JOHN W. HUCKERT, Primary Examiner

J. R. SHEWMAKER, Assistant Examiner